United States Patent
Sebralla et al.

(10) Patent No.: US 11,958,989 B2
(45) Date of Patent: Apr. 16, 2024

(54) METHOD FOR TREATING SURFACES OF ALUMINUM CONTAINING SUBSTRATES

(71) Applicants: Rhodia Operations, Aubervilliers (FR); Chemetall GmbH, Frankfurt (DE)

(72) Inventors: Lars Sebralla, Frankfurt am Main (DE); Nawel Souad Khelfallah, Frankfurt am Main (DE); Axel Schoene, Frankfurt am Main (DE); Marie-Pierre Labeau, Sèvres (FR); Guillaume Gody, Rueil-Malmaison (FR)

(73) Assignees: Rhodia Operations, Aubervilliers (FR); Chemetall GmbH, Frankfurt (DE)

( * ) Notice: Subject to any disclaimer, the term of this patent is extended or adjusted under 35 U.S.C. 154(b) by 537 days.

(21) Appl. No.: 17/272,819

(22) PCT Filed: Sep. 5, 2019

(86) PCT No.: PCT/EP2019/073771
§ 371 (c)(1),
(2) Date: Mar. 2, 2021

(87) PCT Pub. No.: WO2020/049132
PCT Pub. Date: Mar. 12, 2020

(65) Prior Publication Data
US 2021/0253870 A1  Aug. 19, 2021

(30) Foreign Application Priority Data
Sep. 7, 2018 (EP) .................... 18193171

(51) Int. Cl.
| | | |
|---|---|---|
| C09D 5/08 | (2006.01) | |
| C09D 133/08 | (2006.01) | |
| C09D 133/26 | (2006.01) | |
| C23C 22/34 | (2006.01) | |
| C23C 22/56 | (2006.01) | |
| C23C 22/80 | (2006.01) | |
| C23C 22/83 | (2006.01) | |

(52) U.S. Cl.
CPC ............ *C09D 5/08* (2013.01); *C09D 133/08* (2013.01); *C09D 133/26* (2013.01); *C23C 22/34* (2013.01); *C23C 22/56* (2013.01); *C23C 22/80* (2013.01); *C23C 22/83* (2013.01)

(58) Field of Classification Search
None
See application file for complete search history.

(56) References Cited

U.S. PATENT DOCUMENTS

| | | | |
|---|---|---|---|
| 6,020,030 A * | 2/2000 | Guthrie ................. | B05D 7/16 210/681 |
| 6,030,710 A * | 2/2000 | Nitowski ............... | B05D 7/54 428/458 |
| 6,153,705 A | 11/2000 | Corpart et al. | |
| 6,346,475 B1 * | 2/2002 | Suzuki ................ | H01L 21/7682 438/622 |
| 6,545,098 B1 | 4/2003 | Bouhadir et al. | |
| 6,777,513 B1 | 8/2004 | Destarac et al. | |
| 6,812,291 B1 | 11/2004 | Corpart et al. | |
| 8,293,029 B2 | 10/2012 | Jueptner et al. | |
| 2003/0015258 A1 | 1/2003 | Nishimura | |
| 2003/0045661 A1 | 3/2003 | Destarac et al. | |
| 2003/0150524 A1 * | 8/2003 | Wichelhaus .......... | C23C 22/364 148/252 |
| 2006/0173099 A1 * | 8/2006 | Jueptner ................ | C23C 22/44 523/205 |
| 2010/0040798 A1 * | 2/2010 | Dornbusch ............ | C09D 5/088 427/532 |
| 2011/0017352 A1 * | 1/2011 | Vandermeulen ........ | C23C 22/22 148/241 |
| 2012/0070674 A1 | 3/2012 | Sebralla et al. | |
| 2013/0090425 A1 * | 4/2013 | Wakao .................. | C08F 2/10 524/556 |
| 2015/0322288 A1 | 11/2015 | Wasserfallen et al. | |
| 2015/0361274 A1 | 12/2015 | Domes et al. | |
| 2017/0081542 A1 | 3/2017 | Bremser et al. | |
| 2017/0275447 A1 * | 9/2017 | Junk ..................... | C09J 133/12 |
| 2020/0181778 A1 | 6/2020 | Sebralla et al. | |

FOREIGN PATENT DOCUMENTS

| | | | |
|---|---|---|---|
| DE | 102015225185 A1 | 6/2016 | |
| EP | 1206977 A2 | 5/2002 | |

(Continued)

OTHER PUBLICATIONS

Klopsch—WO 2009-050122 A1—PCT D2—MT—phosphonic acid copolymer for paint—2009 (Year: 2009).*

(Continued)

*Primary Examiner* — John Vincent Lawler
(74) *Attorney, Agent, or Firm* — Armstrong Teasdale LLP

(57) ABSTRACT

Described herein is a method for treatment of at least one surface of a substrate at least partially made of aluminum and/or an aluminum alloy, including at least a step of contacting said surface with an acidic aqueous composition (A) including one or more metal compounds (M) selected from the group of titanium compounds, zirconium compounds, and hafnium compounds and one or more linear polymers (P) containing (m1) N,N-dimethyl (meth)acryl amide, (m2) vinylphosphonic acid, and (m3) (meth)acrylic acid in form of their polymerized monomeric units, the one or more linear polymers (P) being included in the acidic aqueous composition (A) in an amount of 50 to 5000 ppm. Also described herein is an acidic aqueous composition (A), a master batch to produce the acidic aqueous composition (A), a method of using the acidic aqueous composition (A) for treating surfaces, and substrates comprising the treated surfaces.

11 Claims, No Drawings

(56) References Cited

FOREIGN PATENT DOCUMENTS

| | | | |
|---|---|---|---|
| FR | 2794464 A1 | 12/2000 | |
| WO | 9630421 A1 | 10/1996 | |
| WO | 9801478 A1 | 1/1998 | |
| WO | 9858974 A1 | 12/1998 | |
| WO | 9931144 A1 | 6/1999 | |
| WO | 9935177 A1 | 7/1999 | |
| WO | 9935178 A1 | 7/1999 | |
| WO | 0075207 A1 | 12/2000 | |
| WO | 0142312 A1 | 6/2001 | |
| WO | 0226836 A2 | 4/2002 | |
| WO | 2009050122 A1 | 4/2009 | |
| WO | WO-2009050122 A1 * | 4/2009 | ............ C08F 230/02 |
| WO | 2010100187 A1 | 9/2010 | |
| WO | 2015173232 A1 | 11/2015 | |
| WO | 2019053023 A1 | 3/2019 | |

OTHER PUBLICATIONS

International Search Report and Written Opinion for corresponding PCT/EP2019/073771 dated Nov. 21, 2019, 10 pages.

\* cited by examiner

_US 11,958,989 B2_

METHOD FOR TREATING SURFACES OF ALUMINUM CONTAINING SUBSTRATES

CROSS-REFERENCE TO RELATED APPLICATIONS

This application is a U.S. National Phase Application of International Patent Application No. PCT/EP2019/073771, filed Sep. 5, 2019, which claims the benefit of priority to European Patent Application No. 18193171.8, filed Sep. 7, 2018, the entire contents of which are hereby incorporated by reference herein.

The present invention relates to a method for treatment of at least one surface of a substrate, wherein said surface is at least partially made of aluminum and/or an aluminum alloy, comprising at least a step of contacting said surface with an acidic aqueous composition (A), said acidic aqueous composition (A) comprising one or more metal compounds (M) selected from the group of titanium compounds, zirconium compounds and hafnium compounds and one or more linear polymers (P) containing (m1) N,N-dimethyl (meth)acryl amide, (m2) vinylphosphonic acid, and (m3) (meth)acrylic acid in form of their polymerized monomeric units, the one or more linear polymers (P) being comprised in the acidic aqueous composition (A) in an amount of 50 to 5000 ppm, based on the total weight of the acidic aqueous composition, to a corresponding acidic aqueous composition (A) as such, to a master batch to produce such acidic aqueous composition (A), to the use of the acidic aqueous composition (A) for treating surfaces and to substrates comprising the thus treated surfaces.

BACKGROUND OF THE INVENTION

Before aluminum materials made from an aluminum alloy are being lacquered, they are nowadays typically subjected to an anti-corrosive and adhesion-promoting treatment with an aqueous solution based on titanium and/or zirconium complex fluoride, with such a solution based on compounds containing phosphonates or with a combination of both solutions in a two-step method. This pretreatment is generally preceded by pickling the aluminum material.

Such a pretreatment is conventionally named "aluminum finishing" and is in particular used for architectural construction elements made of aluminum and/or aluminum alloys in indoor and outdoor areas. Usually, a combination of cleaning and pickling is preferred.

However, the conversion coating(s) produced hereby are not able to sufficiently limit so-called filiform corrosion, especially when aluminum alloys with a low content of silicon are used.

The present one-step pretreatments—with titanium and/or zirconium complex fluoride alone or with compounds containing phosphonates alone—do not deliver satisfying results.

Even the two-step variant of the procedure such as taught by EP 1 206 977 A2, wherein the aluminum surfaces are first treated with titanium and/or zirconium complex fluoride and then with at least one specific phosphonate is not sufficient for the industry's expectations.

The method taught in WO 2010/100187 A1 for pretreating aluminum alloys is also a two-step method. Here, the aluminum materials are first contacted with a compound containing a silane and then with an aqueous composition containing at least one phosphonic compound, wherein a polysiloxane and a phosphonate coating are being successively formed. While the application of said method results in a reduced filiform corrosion such two- or multi-step methods involve greater expenses due to the increased expenditure of time, energy and labor and are therefore disadvantageous and to be avoided.

In numerous applications of aluminum materials, in particular in the area of aluminum finishing, it is also desired—besides good anticorrosion properties—to achieve sufficient adhesion properties when applying a coating onto such as a powder coating.

Problem

Therefore, the object of the present invention is to provide a method for coating aluminum and/or aluminum alloy containing materials by which the disadvantages of the prior art can be avoided and which provides good anti-corrosion at low costs as well as no disadvantages with respect to any adhesion properties when applying further coatings onto.

Solution

This object has been solved by the subject-matter of the claims of the present application as well as by the preferred embodiments thereof disclosed in this specification, i.e. by the subject matter described herein.

A first subject-matter of the present invention is thus a method for treatment of at least one surface of a substrate, wherein said surface is at least partially made of aluminum and/or an aluminum alloy, comprising at least a step of contacting said surface with an acidic aqueous composition (A), the acidic aqueous composition (A) comprising
  (a) one or more metal compounds (M) selected from the group of titanium compounds, zirconium compounds, hafnium compounds and mixtures thereof, and
  (b) one or more linear polymers (P) prepared by controlled radical polymerization containing
    (m1) N,N-dimethyl (meth)acryl amide,
    (m2) vinylphosphonic acid, and
    (m3) (meth)acrylic acid
    in form of their polymerized monomeric units,
  said polymer (P) being comprised in the acidic aqueous composition (A) in an amount of 50 to 5000 ppm, based on the total weight of the acidic aqueous composition (A).

A further subject-matter of the present invention is an acidic aqueous composition (A), said acidic aqueous composition (A) being the one used in the above defined contacting step of the inventive method.

A further subject-matter of the present invention is a master batch to produce the inventive acidic aqueous composition (A) by diluting the master batch with water and if applicable by adjusting the pH value.

An additional subject-matter of the present invention is a use of the inventive acidic aqueous composition (A) for treating at least one surface of a substrate, wherein said surface is at least partially made of aluminum and/or an aluminum alloy, preferably to provide corrosion protection to the surface and/or to provide an increased adhesion of further coatings applied onto the thus treated surface.

A further subject-matter of the present invention is a substrate comprising at least one surface, wherein said surface is at least partially made of aluminum and/or an aluminum alloy, wherein said surface has been treated according to the inventive method and/or by the inventive acidic composition (A).

It has been surprisingly found that due to the presence of the inventively used polymer (P) in composition (A) the properties of the conversion coatings formed by the contacting step, particularly the ability to serve as adhesion promoters for further coatings, can be significantly improved.

It has been further surprisingly found that due to the presence of the inventively used polymer (P) as component (b) in combination with the metal compound (M) used as component (a) in composition (A) also the corrosive subsurface migration and/or diffusion is significantly reduced. Without wanting to be bound by theory it is believed that the metal compounds (M) are apt to etch the aluminum or aluminum alloy surfaces in the acidic environment, resulting in the formation of a pH gradient with increasing pH value near the aluminum or aluminum alloy surface causing a partial dissociation of the protons from the phosphonic acid groups present in monomeric unit (m2) of polymer (P). This in turn causing the attachment of the partially deprotonated phosphonic acid groups to the aluminum surface under formation of a barrier layer which prevents and/or reduces the migration and/or diffusion of corrosive salts to the metallic surface. It has been in particular found that the filiform corrosion is significantly reduced.

DETAILED DESCRIPTION OF THE INVENTION

The term "comprising" in the sense of the present invention, in particular in connection with the inventive method, the inventive(ly used) composition (A) and the inventive master batch, preferably has the meaning "consisting of". In this case, for example, with regard to inventive composition (A), in addition to the mandatory constituents therein (components (a) and (b) and water) one or more of the other optional components (c) to (f) mentioned hereinafter may be contained in the composition. All components can be present in each case in their preferred embodiments mentioned hereinafter. The same applies to the further subject-matter of the present invention.

Inventive Method
Contacting Step (Step (1))

The inventive method comprises at least one step of contacting of at least one surface of a substrate, which surface is at least partially made of aluminum and/or an aluminum alloy, with an acidic aqueous composition (A). This step is in the following referred to as step (1).

The surfaces to be treated may be cleaned by means of an acidic, alkaline or pH-neutral cleaning composition and/or etched before treatment with the acidic aqueous composition (A). The treatment procedure according to step (1), i.e. the "contacting", can, for example, include a spray coating and/or a dip coating procedure. The composition (A) can also be applied by flooding the surface or by roll coating or even manually by wiping or brushing.

The treatment time, i.e. the period of time the surface is contacted with the acidic aqueous composition (A) used in the method for treatment of a surface according to the invention, is preferably from 15 seconds to 20 minutes, more preferably from 30 seconds to 10 minutes, and most preferably 45 seconds to 5 minutes, as for example 1 to 3 minutes.

The temperature of the acidic aqueous composition (A) used in the inventive method for treatment is preferably from 5 to 50° C., more preferably from 15 to 40° C. and most preferably from 25 to 35° C.

Preferably, by performing step (1) of the inventive method a conversion coating layer is formed on the at least one region of the at least one surface of the substrate. In particular, by performing contacting step (1) a coating is preferably formed that preferably has a coating weight determined by XRF (X-ray fluorescence spectroscopy) of:

0.5 to 200, more preferably 2 to 50 and most preferably 3 to 40 mg/m$^2$, of the at least one metal compound (M) used as component (a), calculated as metal, and/or 0.01 to 50, more preferably 0.05 to 40 and most preferably 0.1 to 20 mg/m$^2$, of the at least one polymer (P) used as component (b), calculated as phosphorous, which is mandatorily present in the polymer (P) due to polymerized monomeric unit (m2), and/or 0.1 to 50, more preferably 1 to 40 and most preferably 2 to 20 mg/m$^2$, of the at least one optionally present component (c), which will be described hereinafter, calculated as silicon.

Substrate

The inventive method is a method for treatment of at least one surface of a substrate, wherein said surface is at least partially made of aluminum and/or an aluminum alloy, comprising at least a step of contacting said surface with an acidic aqueous composition (A).

At least one region of the surface is made of aluminum and/or of an aluminum alloy, preferably deposited on a metallic or on a non-metallic substrate. The surface can consist of different regions comprising different metals and/or alloys. However, at least one region of the surface of the substrate is of aluminum and/or an aluminum alloy. Preferably, the overall surface of the substrate is of aluminum and/or of an aluminum alloy.

More preferably, the substrate consists of aluminum and/or of an aluminum alloy, even more preferably of an aluminum alloy.

In case of an aluminum alloy said alloy contains more than 50 wt.-% of aluminum, based on the total weight of the alloy. The method of the invention is in particular suitable for all aluminum alloys containing more than 50 wt.-% aluminum, particularly for aluminum magnesium alloys, including, but not limited to AA5005, as well as for aluminum magnesium silicon alloys, including, but not limited to AA6060 and AA6063, for cast alloys—e.g. AlSi7Mg, AlSi9Mg, AlSi10Mg, AlSi11Mg, AlSi12Mg—as well as for forge alloys—e.g. AlSiMg. However, it is principally suited for all alloys of the so-called AA1000, AA2000, AA3000, AA4000, AA5000, AA6000, AA7000 as well as AA8000 series. Aluminum magnesium alloys, including AA5005, as well as aluminum magnesium silicon alloys, including AA6060 and AA6063, are commonly used in the field of aluminum finishing.

Aqueous Composition (A)

The term "aqueous" with respect to the inventively used composition (A) in the sense of the present invention preferably means that the composition (A) is a composition containing at least 50 wt.-%, preferably at least 60 wt.-%, more preferably at least 70 wt.-% in particular at least 80, most preferably at least 90 wt.-% of water, based on its total content of organic and inorganic solvents including water. Thus, the composition (A) may contain at least one organic solvent besides water—however, in an amount lower than the amount of water present.

The term "acidic" means that the composition (A) has a pH value of less than 7 at room temperature (23° C.). The pH value of the acidic aqueous composition is preferably in the range of 0.5 to 6.9 or of 0.5 to 6.5, more preferred 2.0 to 6.0, even more preferred 2.5 to 5.5, particularly preferred 3.0 to 5.0 and most preferred 3.1 to 4.5. The pH can be preferably adjusted by using nitric acid, aqueous ammonia and/or sodium carbonate (cf. hereinafter: optional component (e)).

The acidic aqueous composition (A) is preferably used as a dip coat bath. However it can also be applied to the aluminum containing surfaces by virtually any conventional coating procedure like e.g. spray coating, roll coating, brushing, wiping etc. as outlined above in connection with step (1).

The inventively used acidic aqueous composition (A) may comprise further components including ions as lined out in the detailed description hereinafter. The term "further comprises", as used herein throughout the description in view of the ingredients of acidic aqueous compositions, means "in addition to the mandatory components (a) and (b) (metal compound (M), and polymer (P). Therefore, such "further" compounds including ions differ from the mandatory ingredients (a) and (b).

The inventively used acidic aqueous composition (A) preferably contains free fluorides. These may result from the presence of component (a), i.e. in particular when complex fluorides of Ti, Zr and/or Hf are present in (A) as component (a), but may also or alternatively result from the presence of optional component (g) as described hereinafter. The amount of free fluoride ($F^-$) in the acidic aqueous composition (A) used in the method for treatment according to the invention is preferably in the range of 1 to 500 ppm, more preferably 2 to 250 ppm and most preferred 5 to 150 ppm. The free fluoride content is determined by means of a fluoride electrode.

The total amount of all components present in the inventive composition (A) adds up to 100 wt.-%.

Metal Compound (M) as Component (a)

The metal compounds (M) selected from titanium, zirconium and hafnium compounds as well as mixtures thereof are preferably added in an amount to achieve a metal concentration of titanium, zirconium, hafnium or a mixture of these metals in the range from 50 to 5000 ppm, more preferably in the range from 50 to 4500 ppm, still more preferably in the range from 75 to 4000 ppm, even more preferably in the range from 100 to 3500 ppm and most preferably in the range from 150 to 3000 ppm, as e.g. 200 to 2500 ppm or 250 to 2000 ppm, based in each case on Ti, Zr, Hf or their combinations as metal, in composition (A).

Preferably, the amount of component (a) in the composition (A) is higher than the amount of component (b).

Preferably, component (a) is water-soluble. Solubility is determined at a temperature of 20° C. and atmospheric pressure (1.013 bar).

The content of component (a) can be monitored and determined by the means of ICP-OES (optical emission spectroscopy with inductively coupled plasma). Said method is described hereinafter in detail.

Particularly preferred titanium, zirconium and hafnium compounds are the complex fluorides of these metals. The term "complex fluoride" includes the single and multiple protonated forms as well as the deprotonated forms. It is also possible to use mixtures of such complex fluorides. In particular, composition (A) contains at least two different complex fluorides, most preferably it contains at least one titanium and at least one zirconium complex fluoride. Complex fluorides in the sense of the present invention are complexes of titanium, zirconium and/or hafnium formed with fluoride ions in composition (A), e.g. by coordination of fluoride anions to titanium, zirconium and/or hafnium cations in the presence of water.

Moreover, zirconium can also be added in form of zirconyl compounds as e.g. zirconyl nitrate and zirconyl acetate; or zirconium carbonate or zirconium nitrate, the latter one being particularly preferred. The same applies to titanium and hafnium.

Polymer (P) as Component (b)

Polymer (P) is a linear polymer (P) containing (m1) N,N-dimethyl (meth)acryl amide, (m2) vinylphosphonic acid, and (m3) (meth)acrylic acid in form of their polymerized monomeric units. The at least one polymer (P) is present in the acidic aqueous composition (A) in an amount of 50 to 5000 ppm, based on the total weight of the acidic aqueous composition (A).

Polymer (P) is preferably soluble in acidic composition (A). Solubility is determined at a temperature of 20° C. and atmospheric pressure (1.013 bar).

The term "(meth)acryl" means "acryl" and/or "methacryl". Similarly, "(meth)acrylate" means acrylate and/or methacrylate. Polymer (P) is a "(meth)acryl polymer", which is formed from "acryl monomers" and/or "methacryl monomers", but also has non-acryl and non-methacryl units due to the use of monomer (m2). Preferably, the backbone of the (meth)acryl polymer is formed from more than 50 mole-%, even more preferably of from more than 75 mole-% of (meth)acryl monomers.

The term "polymerized monomeric unit" means the unit generated by polymerization of the respective monomer. For example, the polymerized monomeric unit of vinylphosphonic acid ($H_2C=CH-P(=O)(OH)_2$) is $H_2C^*-C^*H-P(=O)(OH)_2$, wherein the asterisks denote the carbon atoms bound to the adjacent polymerized monomeric units, which form the polymeric backbone of polymer (P).

Polymer (P) is preferably present in composition (A) in an amount in the range from 100 to 5000 ppm, more preferably in the range from 150 to 4500 ppm, still more preferably in the range from 175 to 4000 ppm, even more preferably in the range from 200 to 3500 ppm and most preferably in the range from 225 to 3000 ppm, as e.g. 250 to 2000 ppm or 300 to 1500 ppm.

Polymer (P) is a linear polymer. The monomeric units can be arranged statistically, in two or more blocks or as a gradient along the polymeric backbone of polymer (P). However, such arrangements can also be combined.

The polymers (P) are prepared by controlled radical polymerization. Polymer (P) is specifically prepared by a controlled radical polymerization of monomers (m1), (m2) and (m3), said polymerization being carried out continuously or batchwise. Preferably, the one or more polymers (P) used in the method of treatment according to the present invention are random copolymers obtained by a controlled radical copolymerization of monomers (m1), (m2) and (m3), namely copolymers obtained by contacting monomers (m1), (m2) and (m3), a free radical source and a radical polymerization control agent.

The inventively used polymer (P) may contain only one kind of each monomeric units (m1), (m2), and (m3), but also may comprise different kinds of monomeric units (m1) and/or different kinds of monomeric units (m2) and/or different kinds of monomeric units (m3). Polymer (P) preferably is a terpolymer with no other monomers than (m1), (m2) and (m3) being used, i.e., made of one of monomeric units (m1), (m2) and (m3) only.

Preferably, polymer (P), preferably being a terpolymer, contains

N,N-dimethyl (meth)acryl amide monomeric units (m1) present in the polymer in an amount of 5 to 70 mole-%, more preferably of 20 to 55 mole-%, even more preferably of 40 to 50 mole-%, vinylphosphonic acid monomeric units (m2) present in the polymer in an amount of 2 to 50 mole-%, more preferably 3 to 35 mole-%, still more preferably of 4 to 25 mole-%, (meth)acrylic acid monomeric units (m3) present in the polymer in an amount of 25 to 85 mole-%, more preferably of 40 to 70 mole-%, in particular of 45 to 60 mole-%, in each case based on the total amount of all monomeric units of polymer (P), wherein the sum of all monomeric units present in polymer (P) adds up to 100 mole-%.

Preferably, polymer (P) has a degree of polymerization in the range of 30 to 500, more preferably of 40 to 480 and most preferably of 55 to 400.

Preferably, polymer (P) has a number average molecular weight $M_n$, which is preferably in the range of 5,000 to 60,000 g/mol, more preferably of 10,000 to 50,000 g/mol or of 15,000 to 50,000 g/mol, more preferably of 10,000 to 47,000 g/mol and most preferably of 10,000 to 42,000 g/mol. The number average number and weight molecular weight (respectively) $M_n$ and $M_w$ are determined by the method described hereinafter.

In particular, component (b) of composition (A) is a polymer (P) that is selected from the group consisting of (meth)acrylic acid-N,N-dimethyl (meth)acryl amide-vinylphosphonic acid-terpolymers having a number average molecular weight in the range of 10,000 to 42,000 g/mol.

As an illustrative example, a polymer (P) especially useful according to the instant invention is a terpolymer obtained by a controlled radical polymerization of a monomer mixture consisting of 2 to 10 mole-% of vinylphosphonic acid, 20 to 40 mole-% of N,N-dimethyl (meth)acryl amide and 20 to 70 mole-% of (meth)acrylic acid, wherein the sum of all monomeric units present in polymer (P) adds up to 100 mole-%, having a number averaged molecular weight $M_n$ between 30 000 and 50 000 and a weight averaged molecular weight $M_w$ between 80 000 and 150 000. Such a polymer may be prepared by a controlled radical polymerization using O-ethyl S-(1-(methoxycarbonyl)ethyl) xanthate as a control agent as defined below, according to the process described for example in WO 98/58974 A1.

As outlined above a radical polymerization control agent is preferably used for preparing the inventively used polymer (P). Herein, the term "radical polymerization control agent" (or more concisely "control agent") refers to a compound which is capable of extending the lifetime of the growing polymer chains in a radical polymerization reaction and of conferring, on the polymerization, a living or controlled nature. This control agent is typically a reversible transfer agent as used in controlled radical polymerization denoted by the terminology RAFT or MADIX, which typically use a reversible addition-fragmentation transfer process, such as those described, for example, in WO 96/30421, WO 98/01478, WO 99/35178, WO 98/58974, WO 00/75207, WO 01/42312, WO 99/35177, WO 99/31144, FR 2794464 or WO 02/26836.

Preferably, the radical polymerization control agent used for preparing polymer (P) is a compound which comprises a thiocarbonylthio group —S(C=S)—. Thus, for example, it may be a compound which comprises at least one xanthate group (bearing —SC=S—O— functions), for example one or two xanthates. According to one embodiment, the compound comprises several xanthates. Other types of control agent may be envisaged (for example of the type used in ATRP (Atom Transfer Radical Polymerization or NMP (Nitroxide-mediated Polymerization)). Typically, the control agent is a non-polymeric compound bearing a group that ensures control of the radical polymerization, especially a thiocarbonylthio group —S(C=S)—. According to a more specific variant, the radical polymerization control agent is a polymer, advantageously an oligomer and bearing a thiocarbonylthio —S(C=S)— group, for example a xanthate —SC=S—O— group, typically obtained by a radical polymerization monomers in the presence of a control agent bearing a thiocarbonylthio —S(C=S)— group, for example a xanthate.

A suitable control agent may, for example, have to formula (A) below:

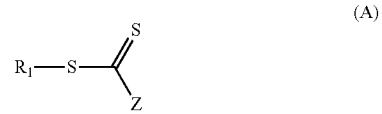

(A)

wherein:

Z represents hydrogen, chlorine, a cyano group, a dialkyl- or diaryiphosphonato radical, dialkyl-phosphinato or diaryl-phosphinato radical or any of the following optionally substituted radicals: an alkyl radical, an aryl radical, a heterocyclic radical, an alkyl thio radical, an aryl thio radical, an alkoxy radical, an aryloxy radical, an amino radical, a hydrazine radical, an alkoxycarbonyl radical, an aryloxycarbonyl radical, an acyloxy or carboxyl radical, an aroyloxy radical, a carbamoyl radical, polymeric chain radical; and $R_1$ represents any of the following optionally substituted radicals: an alkyl radical, an acyl radical, an aryl radical, an aralkyl radical, an alkenyl radical or alkynyl radical; or a saturated or unsaturated or aromatic, optionally substituted carbocycle or heterocycle; or a polymer chain radical, which is preferably hydrophilic or water-dispersible.

The groups $R_1$ or Z, when they are substituted, may be substituted with optionally substituted phenyl groups, optionally substituted aromatic groups, saturated or unsaturated carbocycles, saturated or unsaturated heterocycles, or groups chosen from the following: alkoxycarbonyl or aryloxycarbonyl (—COOR), carboxyl (—COOH), acyloxy (—O₂CR), carbamoyl (—CONR₂), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR₂), halogen, perfluoroalkyl $C_nF_{2n+1}$, allyl, epoxy, alkoxy (—OR), S-alkyl, S-aryl, groups of hydrophilic or ionic nature, such as alkali metal salts of carboxylic acids, alkali metal salts of sulfonic acids, polyalkylene oxide (PEO, PPO) chains, cationic substituents (quaternary ammonium salts), R representing an alkyl or aryl group, or a polymer chain.

The group $R_1$ may alternatively be amphiphilic, i.e. it may have both hydrophilic and lipophilic nature. It is preferable for $R_1$ not to be hydrophobic.

$R_1$ may typically be a substituted or unsubstituted, preferably substituted, alkyl group. A control agent of formula (A) may nevertheless comprise other types of groups $R_1$, in particular a ring or a polymer chain radical. The optionally substituted alkyl, acyl, aryl, aralkyl or alkyne groups generally bear from 1 to 20 carbon atoms, preferably from 1 to 12 and more preferentially from 1 to 9 carbon atoms. They may be linear or branched. They may also be substituted with oxygen atoms, in particular in the form of esters, sulfur atoms or nitrogen atoms. Among the alkyl radicals, mention may be made especially of the methyl, ethyl, propyl, butyl, pentyl, isopropyl, tert-butyl, pentyl, hexyl, octyl, decyl or dodecyl radical. The alkyne groups are radicals preferably comprising 2 to 10 carbon atoms; they bear at least one acetylenic unsaturation, such as the acetylenyl radical. The acyl group is a radical preferably bearing from 1 to 20 carbon atoms with a carbonyl group. Among the aryl radicals, mention may be made especially of the phenyl radical, which is optionally substituted, in particular with a nitro or hydroxyl function. Among the aralkyl radicals, mention may be made especially of the benzyl or phenethyl radical, which is optionally substituted, in particular with a nitro or hydroxyl function. When $R_1$ or Z is a polymer chain radical, this polymer chain may result from a radical or ionic polymerization or from a polycondensation.

Advantageously, the control agent is selected from compounds bearing a xanthate —S(C=S)O—, trithiocarbonate, dithiocarbamate or dithiocarbazate function, for example compounds bearing an O-ethyl xanthate function of formula —S(C=S)OCH$_2$CH$_3$. Xanthates prove to be very particularly advantageous, in particular those bearing an O-ethyl xanthate —S(C=S)OCH$_2$CH$_3$ function, such as O-ethyl S-(1-(methoxycarbonyl)ethyl) xanthate (CH$_3$CH(CO$_2$CH$_3$)) S(C=S)OEt.

Further Optional Components of Composition (A)-Component (c)

The inventively used acidic aqueous composition (A) may comprise further components including ions. Optional components (c) to (f) as described hereinafter are different from one another and also different from mandatory components (a) and (b) as well as water when these optional components are present in the composition (A).

Preferably, the inventively used acidic aqueous composition (A) further comprises at least one component (c), namely at least one kind of metal cations selected from the group of cations of metals of the $1^{st}$ to $3^{rd}$ subgroup (copper, zinc and scandium groups) and $5^{th}$ to $8^{th}$ subgroup (vanadium, chromium, manganese, iron, cobalt and nickel groups) of the periodic table of the elements including the lanthanides as well as the $2^{nd}$ main group of the periodic table of the elements (alkaline earth metal group), lithium, bismuth and tin. The before-mentioned metal cations are generally introduced in form of their water-soluble compounds, preferably as their water-soluble salts.

More preferably the further metal cation(s) is/are selected from the group consisting of cations of cerium and the other lanthanides, chromium, iron, calcium, cobalt, copper, magnesium, manganese, molybdenum, nickel, niobium, tantalum, yttrium, vanadium, lithium, bismuth, zinc and tin.

Most preferred as further metal cations are manganese, lithium and zinc cations. Amongst these, most preferred are manganese cations in the +II oxidation state or lithium cations. In particular it has been surprisingly found that the use of lithium ions leads to a further reduction of the filiform corrosion. Alternatively, component (c) of the composition comprises is molybdenum and/or vanadium cations, preferably molybdenum cations, having a concentration in the range of 1 to 400 ppm, more preferably of 2 to 300 ppm and most preferably of 4 to 75 ppm, calculated as metal(s).

Generally the total concentration of the further metal cations under this headline may be in the range of 1 to 5000 ppm, calculated as metal. Preferably, the concentration of component (c) is in the range of 1 to 950 ppm, more preferably of 5 to 700 ppm, even more preferably of 15 to 500 ppm and is most preferably in the range of 17 to 350 ppm, calculated as metal(s) in each case.

Further Optional Components of Composition (A)-Component (d)

Preferably, the inventively used acidic aqueous composition (A) further comprises at least one component (d), namely at least one pH-Value adjusting substances, more preferably selected from the group consisting of nitric acid, sulfuric acid, methanesulfonic acid, acetic acid, aqueous ammonia, sodium hydroxide and sodium carbonate, wherein nitric acid, aqueous ammonia and sodium carbonate are preferred. Depending on the pH value of the acidic aqueous composition (A), the above compounds can be in their fully or partially deprotonated form or in protonated forms.

Further Optional Components of Composition (A)-Component (e)

Preferably, the inventively used acidic aqueous composition (A) further comprises at least one component (e), namely at least one water-soluble fluorine compound. Examples of such water-soluble fluorine compounds are fluorides as well as hydrofluoric acid. In particular, component (e) is present in composition (A), when component (a) is not present in the form of a complex fluoride of titanium, zirconium and/or hafnium in composition (A).

Further Optional Components of Composition (A)-Component (f)

Preferably, the inventively used acidic aqueous composition (A) further comprises at least one component (f), namely at least one further ion not being encompassed by any of the other components present in (A). Examples of such further ions are sodium and/or ammonium ions, phosphates and/or phosphonates, and nitrates. However sulfur containing compounds, particularly sulfates should be avoided. Therefore it is preferred that the amount of sulfur containing compounds in the acidic aqueous composition (A) is below 100 ppm (calculated as sulfur).

Optional Further Steps of the Inventive Method

Prior to step (1) one or more of the following optional steps can be performed in this order:

Step (A-1): cleaning and optionally subsequently rinsing the surface of the substrate, Step (B-1): subjecting the surface of the substrate to acidic pickling, i.e., etching, and subsequently rinsing the surface of the substrate, Step (C-1): contacting the surface of the substrate with an aqueous composition comprising at least one mineral acid, said aqueous composition being different from composition (A) or alternatively with an aqueous alkaline composition or pH-neutral aqueous composition and Step (D-1): rinsing the surface of the substrate obtained after the contact according to step (0-1) and/or (B-1).

Alternatively, steps (A-1) and (B-1) may be performed in one step, which is preferred. Preferably, both steps (A-1) and (B-1) are performed.

Optional step (C-1) serves to remove aluminum oxide, undesired alloy components, the skin, brushing dust etc. from the surface of the substrate and to thereby activate the surface for the subsequent conversion treatment in step (1) of the method according to the invention.

Preferably, the at least one mineral acid of the composition in step (C-1) is sulfuric acid and/or nitric acid, more preferably sulfuric acid. The content of the at least one mineral acid is preferably in the range of 1.5 to 50 g/l, more preferably of 2 to 20 g/l and most preferably of 3 to 10 g/l. The composition used in step (C-1) preferably additionally comprises one or more metal compounds (M) selected from the group of titanium compounds, zirconium compounds, hafnium compounds and mixtures thereof. The same metal compounds (M) in the same amounts can be used in step (C-1) as described as component (a) of the composition (A) used in step (1). In the treatment of parts the duration of treatment with the composition in step (C-1) is preferably in the range of 30 seconds to 10 minutes, more preferably of 40 seconds to 6 minutes and most preferably of 45 seconds to 4 minutes. The treatment temperature is preferably in the range of 20 to 55° C., more preferably of 25 to 50° C. and most preferably of 30 to 45° C. In the treatment of coils, the duration of treatment is preferably in the range of 3 seconds to 1 minute, most preferably of 5 to 20 seconds.

Rinsing step (D-1) and the optional rinsing being part of step (A-1) are preferably performed by using deionized water or tap water. Preferably, step (D-1) is performed by using deionized water.

After having performed mandatory step (1) of the inventive method one or more of the following optional steps can be performed in this order:

Step (2): rinsing the surface of the substrate obtained after the contact according to step (1), Step (3): contacting the surface of the substrate obtained after step (1) or after optional step (2) with an aqueous acidic composition (B) being the same or different from composition (A), Step (4): rinsing the surface of the substrate obtained after the contact according to step (3), and Step (5): drying the surface of the substrate obtained after the contact according to step (1), after the rinsing of step (2), after the contact according to step (3) or after the rinsing of step (4).

After step (1) of the method according to the invention the surface of the substrate obtained after contact according to step (1) can be rinsed, preferably with deionized water or tap water (optional step (2)). After optional step (3) of the method according to the invention the surface of the substrate obtained after contact according to optional step (3) can be rinsed, preferably with water (optional step (4)).

Rinsing steps (2) and (4) may be carried out in order to remove excess components present in composition (A) used in step (1) and optionally also in the composition used in optional step (3) such as for example the polymer (P) and/or disruptive ions from the substrate.

In one preferred embodiment, rinsing step (2) is carried out after step (1). In another preferred embodiment, no rinsing step (2) is performed. In both embodiments, an additional drying step (5) is preferably performed.

The aqueous composition (B) applied in step optional step (3) of the method according to the invention may for example be another composition as used in step (1), i.e. a composition, which is different from the composition (A) used in step (1), but does not necessarily have to, i.e. can be identical to composition (A).

Preferably, the aqueous composition (B) applied in step optional step (3) contains one or more linear polymers (P) prepared by controlled radical poylmerization containing
(m1) N,N-dimethyl (meth)acryl amide,
(m2) vinylphosphonic acid, and
(m3) (meth)acrylic acid
in form of their polymerized monomeric units, i.e. the same polymer (P) that is used as component (b) of composition (A) used in step (1). Preferably, the polymers (P) used in steps (1) and (3) are identical. Preferably, the composition (B), however, does not contain any metal compounds (M) selected from the group of titanium compounds, zirconium compounds, hafnium compounds and mixtures thereof, i.e., does not contain the component (a) being present in composition (A). This is especially advantageous in case of aluminium profiles and sheets as substrates and results in a remarkable further improvement of anti-corrosion and lacquer adhesion values.

The surfaces of the inventively used substrate can be coated by further, i.e. subsequent coatings. The inventive method thus may contain at least one further optional step, namely Step (6): applying at least one coating composition to the surface of the substrate obtained after step (1) or after any of optional steps (2) to (5) to form a coating layer upon the surface.

The coating composition used in step (6) is preferably different from compositions (A) and (B) and preferably comprises at least one polymer being suitable as binder, said polymer being preferably different from polymer (P). Examples of such polymers being different from polymer (P) are in particular polyesters.

Preferably, step (6) is performed. Preferably, the coating composition used in step (6) is a powder coating composition. Any conventional powder coating composition may be used in such a step. Examples of commercial products are Interpon® D2525 (AkzoNobel) and Corro-Coat® PE-SDF (ChemRez Technologies).

Preferably, the inventive method comprises said step (6) as an additional coating step of applying at least one coating composition such as a powder coating composition to the surface of the substrate obtained after the contacting step (1)—i.e. to the surface of the substrate bearing a conversion coating layer due to having performed step (1), to form a coating layer upon the surface, wherein optionally after step (1) a rinsing step (2) is carried out prior to said coating step (6). Independently whether said optional rinsing step (2) is performed or not, a drying step (5) is preferably carried out in turn prior to coating step (6).

Before the application of further coatings according to step (6) the treated surface is preferably rinsed to remove excessive polymer (P), as well as optionally present unwanted ions.

The subsequent coatings can be applied wet-on-wet onto the metallic surface as treated in the method for treatment according to the invention. However it is also possible to dry the metallic surface as treated according to the invention before applying any further coating.

The surface as treated in the method for treatment according to the present invention may be subsequently coated with a cathodic electrodeposition coating composition. Preferably the cathodic electrodeposition coating composition comprises epoxy resins and/or poly(meth)acrylates and if applicable crosslinking agents such as blocked polyisocyanates and/or aminoplast resins.

However, in particular, the surface as treated in the method for treatment according to the present invention is subsequently coated with a powder coating composition in a step (6).

Inventive Composition

A further subject-matter of the present invention is an acidic aqueous composition (A), said acidic aqueous composition (A) comprising (a) one or more metal compounds (M) selected from the group of titanium compounds, zirconium compounds, hafnium compounds and mixtures thereof, and (b) one or more linear polymers (P) prepared by controlled radical polymerization containing
    (m1) N,N-dimethyl (meth)acryl amide,
    (m2) vinylphosphonic acid, and
    (m3) (meth)acrylic acid
    in form of their polymerized monomeric units,
said polymer (P) being comprised in the acidic aqueous composition (A) in an amount of 50 to 5000 ppm, based on the total weight of the acidic aqueous composition (A).

i.e. the composition (A), which is used in step (1), the contacting step of the inventive method.

All preferred embodiments described above herein in connection with the inventive method and the inventively used composition (A), which is used in the contacting step (1) of said method, and the components contained therein, in particular components (a), (b) and water, but also optional components (c) to (f) are also preferred embodiments of inventive acidic aqueous composition (A) as such.

Inventive Master Batch

A further subject-matter of the present invention is a master batch to produce the inventive acidic aqueous composition (A) by diluting the master batch with water and if applicable by adjusting the pH value.

All preferred embodiments described above herein in connection with the inventive method and the inventively used composition (A), which is used in the contacting step (1) of said method, and the components contained therein, in particular components (a), (b) and water, but also optional components (c) to (f), as well as described above herein in connection with inventive acidic aqueous composition (A) as such are also preferred embodiments of inventive master batch.

If a master batch is used to produce the acidic aqueous composition (A) according to the present invention, the master batch typically contains the ingredients of the acidic aqueous composition (A) to be produced in the desired proportions, namely components (a) and (b), but at a higher concentration. Such master batch is preferably diluted with water to the concentrations of ingredients as disclosed above to form the acidic aqueous composition (A). If necessary, the pH value of the acidic aqueous composition may be adjusted after dilution of the master batch.

Of course, it is also possible to further add any of the optional components to the water, wherein the master batch is diluted or to add any of the optional components after diluting the master batch with water. It is however preferred that the master batch already contains all necessary components.

Preferably, the master batch is diluted with water and/or an aqueous solution in the ratio of 1:5,000 to 1:10, more preferred 1:1,000 to 1:10, most preferred in the ratio of 1:300 to 1:10 and even more preferred 1:150 to 1:50.

Inventive Use

A further subject-matter of the present invention is a use of the inventive acidic aqueous composition (A) for treating at least one surface of a substrate, wherein said surface is at least partially made of aluminum and/or an aluminum alloy.

Preferably, said use provides corrosion protection to the surface and/or provides an increased adhesion of further coatings applied onto the thus treated surface.

All preferred embodiments described above herein in connection with the inventive method and the inventively used composition (A), which is used in the contacting step (1) of said method, and the components contained therein, in particular components (a), (b) and water, but also optional components (c) to (f), as well as described above herein in connection with inventive acidic aqueous composition (A) as such and the inventive master batch are also preferred embodiments of the inventive use.

Inventive Substrate

A further subject-matter of the present invention a substrate comprising at least one surface, wherein said surface is at least partially made of aluminum and/or an aluminum alloy, wherein said surface has been treated according to the inventive method and/or by the inventive acidic composition (A).

All preferred embodiments described above herein in connection with the inventive method and the inventively used composition (A), which is used in the contacting step (1) of said method, and the components contained therein, in particular components (a), (b) and water, but also optional components (c) to (f), as well as described above herein in connection with inventive acidic aqueous composition (A) as such, the inventive master batch and the inventive use are also preferred embodiments of the inventive substrate.

In particular, the substrate is foil, sheet, cast or profile made at least partially of aluminum and/or an aluminum alloy.

Test Methods

1. Determination of Average Molecular Weights $M_w$ and $M_n$

The number average and weight average molecular weights ($M_n$ and $M_w$), respectively, are measured according to the following protocol: Samples are analyzed by SEC (size exclusion chromatography) equipped with a MALS detector. Absolute molar masses are obtained with a dn/dC value chosen equal to 0.1875 mL/g in order to get a recovery mass around 90%. Polymer samples are dissolved in the mobile phase and the resulting solutions are filtrated with a Millipore filter 0.45 µm. Eluting conditions are the following ones. Mobile phase: $H_2O$ 100% vol. 0.1 M NaCl, 25 mM $NaH_2PO_4$, 25 mM $Na_2HPO_4$; 100 ppm $NaN_3$; flow rate: 1 mL/min; columns: Varian Aquagel OH mixed H, 8 µm, 3*30 cm; detection: RI (concentration detector Agilent)+MALLS (MultiAngle Laser Light Scattering) Mini Dawn Tristar+UV at 290 nm; samples concentration: around 0.5 wt % in the mobile phase; injection loop: 100 µL.

2. ICP-OES

The amount of certain elements in a sample under analysis, such as of titanium, zirconium and hafnium, being present in component (a), is determined using inductively coupled plasma atomic emission spectrometry (ICP-OES) according to DIN EN ISO 11885 (date: Sep. 1, 2009). A sample is subjected to thermal excitation in an argon plasma generated by a high-frequency field, and the light emitted due to electron transitions becomes visible as a spectral line of the corresponding wavelength, and is analyzed using an optical system. There is a linear relation between the intensity of the light emitted and the concentration of the element in question, such as titanium, zirconium and/or hafnium. Prior to implementation, using known element standards (reference standards), the calibration measurements are carried out as a function of the particular sample under analysis. These calibrations can be used to determine concentrations of unknown solutions such as the concentration of the amount of titanium, zirconium and hafnium.

3. Crosscut Testing to DIN EN ISO 2409 (06-2013)

The crosscut test is used to ascertain the strength of adhesion of a coating on a substrate in accordance with DIN EN ISO 2409 (06-2013). Cutter spacing is 2 mm. Assessment takes place on the basis of characteristic cross-cut values in the range from 0 (very good adhesion) to 5 (very poor adhesion). The crosscut test may also be performed after storaging the sample for 2 h in boiling water in order to determine the wet adhesion. Further, the crosscut test may also be performed after having carried out the reverse impact test (ASTM D 2794, 1993) as described in item 7. (falling height 50 cm). Further, the crosscut test may also be performed after storaging the sample for 2 h in boiling water followed by carrying out the reverse impact test as described in item 7. (falling height 50 cm).

4. Acetic Acid Salt Spray (AASS) Mist Testing to DIN EN ISO 9227 (09-2012)

The acetic acid salt spray mist test is used for determining the corrosion resistance of a coating on a substrate. In accordance with DIN EN ISO 9227 (09-2012) the samples under analysis are in a chamber in which there is continuous misting of a 5% salt solution, the salt solution being admixed with acetic acid, at a temperature of 35° C. over a duration of 1008 hours, with controlled pH (pH 3.1). The spray mist deposits on the samples under analysis, covering them with a corrosive film of salt water. If, still prior to the acetic acid salt spray mist testing, the coating on the samples for investigation is scored down to the substrate with a blade incision, the samples can be investigated for their level of under-film corrosion in accordance with DIN EN ISO 4628-8 (03-2013), since the substrate corrodes along the score line during the acetic acid salt spray mist test. As a result of the progressive process of corrosion, the coating is undermined to a greater or lesser extent during the test. The extent of undermining in [mm] is a measure of the resistance of the coating. After the AASS mist test has been carried out the samples can further be studied to assess their degree of blistering according to DIN EN ISO 4628-2 (01-2004). The assessment is made using characteristic values for size and amount of blisters in the range from 0 (low blistering) to 5 (very severe blistering), with a determination being made of both the frequency and the size of the blisters.

5. Filiform Corrosion (FFG) to DIN EN 3665 (08-1997)

Determining the filiform corrosion is used to ascertain the corrosion resistance of a coating on a substrate. This determination is carried out to DIN EN 3665 (08-1997) over a duration of 1008 hours. In the course of this time, the coating in question, starting from a line of induced damage to the coating, is undermined by corrosion that takes the form of a line or thread. The maximum thread length in [mm] is measured according to DIN EN 3665 (08-1997) (method 3).

6. Bend Test

A mandril bending test is performed by making use of the cylindrical mandril bending device 266 S of the company Erichsen and by using a mandril of 5 mm according to EN ISO 1519 (04-2011).

7. Reverse Impact Resistance

Determination of impact resistance of coatings is performed according to ASTM D 2794 (1993) or DIN EN ISO 6272-2 (11-2011) via an impact tester (25 cm or 50 cm falling height). The test is executed at 20 inch-pounds (at 25 cm) or 40 inch-pounds (at 50 cm) using a weight diameter of 15.9 mm.

EXAMPLES

The following examples further illustrate the invention but are not to be construed as limiting its scope.

1. Acidic Aqueous Compositions (A)

1.1 Polymer (P) as component (b) (P) has been used, which is a terpolymer obtained by a controlled radical polymerization of a monomer mixture consisting of 2 to 10 mole-% of vinylphosphonic acid, 20 to 40 mole-% of N,N-dimethyl (meth)acryl amide and 20 to 70 mole-% of (meth)acrylic acid, wherein the sum of all monomeric units present in polymer (P) adds up to 100 mole-%, having a number averaged molecular weight $M_n$ between 30 000 and 50 000 and a weight averaged molecular weight $M_w$ between 80 000 and 150 000. The polymer (P) is prepared by a controlled radical polymerization using O-ethyl S-(1-(methoxycarbonyl)ethyl) xanthate as a control agent.

1.2 5 litres of deionized water and 15 g/L of the commercially available product Gardobond® X 4707 (available from Chemetall GmbH) have been placed in a beaker. Said product is an acidic aqueous solution, which contains one or more metal compounds (M) selected from the group of titanium compounds and zirconium compounds as component (a).

Two inventive acidic compositions (A) have been prepared, namely A1 and A2. To the above mentioned Gardobond® X 4707 product polymer (P) as described in item 1.1 has been added in an amount of 1000 ppm (A1) or 1500 ppm (A2), based on the total weight of the acidic aqueous composition (A).

1.3 Two comparative acidic aqueous compositions (CA1) and (CA2) have been prepared in the same manner as outlined in items 1.1 and 1.2 with the only difference that not polymer (P) has been added to (A1) or (A2), but instead a commercially available poly(meth)acrylic acid in an amount of 1000 ppm (CA1) or 1500 ppm (CA2). The poly(meth)acrylic acid is available from BASF SE under the tradename Sokolan® PA 25 X.

2. Inventive Method 2.1 Two different kinds of substrates have been used, namely aluminum magnesium alloy AA5005 (substrate T1) and aluminum profile AA6060 (substrate T2).

In a cleaning step (A-1) these substrates have been cleaned by making use of the commercial product Gardoclean® T 5281 or Gardoclean® T 5287 (Chemetall GmbH) (60° C., 10 minutes) followed by an etching step (B-1). The etching was performed by making use of the commercial products Gardoclean® T 5491 (Chemetall GmbH) and Gardobond® H 7269 (Chemetall GmbH) (90 seconds, etching rate >1.0 g/m³). Between performance of (A-1) and (B-1) rinsing with tap water is performed twice (30 seconds each).

After carrying out etching step (B-1) rinsing with tap water (30 seconds) followed by rinsing with deionized water (30 seconds) is performed.

2.2 After performance of the steps as outlined in item 2.1, contacting step (1) is carried out, i.e. the surfaces of the substrates are contacted with inventive acidic composition (A1) or (A2) or with comparative composition (CA1) or (CA2) in order to form a conversion coating layer on the substrate. The contacting step is performed for 45 seconds.

After having performed said contacting step (1) the resulting substrate bearing a conversion coating layer due to carrying out the contacting step is either subjected to a rinsing step (2) with deionized water (alternative 1) or no such rinsing step is performed (alternative 2).

Following both alternative 1 and alternative 2 a drying step (5) is performed (10 minutes at 80° C.). Afterwards, a powder coating layer is applied onto the substrates (step (6)). Two commercially available powder coating compositions are used, namely the product Corro-Coat® PE-SDF (Chem-Rez Technologies) or the product Interpon® D2525 (AkzoNobel). The dry layer thicknesses of these coatings obtained are in the range of 60-120 µm.

3. Properties of the Coated Substrates 3.1 A number of properties of the coated substrates obtained by the inventive method described in item 2. have been investigated. These properties were determined according to the test methods described hereinbefore. The results are displayed in Tables 1a and 2a as well as 2b.

3.2 Alternative 1 (Rinsing Step after Contacting Step)

TABLE 1a

Corro-coat ® PE-SDF coated substrates

| Test | use of (A1) in step (1) (inventive) | use of (CA1) in step (1) (comparative) |
|---|---|---|
| Crosscut | 0 | 0 |
| Crosscut after impact (50 cm) | 0.5 | 2 |
| Crosscut after 2 h of boiling | 0 | 0 |
| Impact (25 cm) | ok | ok |
| Bend-test | ok | ok |

3.3 Alternative 2 (No Rinsing Step after Contacting Step)

TABLE 2a

Corro-coat ® PE-SDF coated substrates

| Test | use of (A1) in step (1) (inventive) | use of (A2) in step (1) (inventive) | use of (CA1) in step (1) (comparative) | use of (CA2) in step (1) (comparative) |
|---|---|---|---|---|
| Crosscut | 0 | 0 | 0 | 0 |
| Crosscut after impact (50 cm) | 0 | 0 | 0.75 | 0.25 |
| Crosscut after 2 h of boiling | 0 | 0 | 3.5 | 1 |
| Impact (25 cm) | ok | ok | ok | ok |
| Bend-test | ok | ok | ok | Not ok |

TABLE 2b

Interpon ® D2525 coated substrates

| Test | use of (A1) in step (1) (inventive) | use of (A2) in step (1) (inventive) | use of (CA1) in step (1) (comparative) | use of (CA2) in step (1) (comparative) |
|---|---|---|---|---|
| FFC average thread length | ok | ok | Not ok | Not ok |
| FFC maximum thread length | ok | ok | Really bad | Not ok |

The invention claimed is:

1. A method for treatment of at least one surface of a substrate, wherein said surface is at least partially made of aluminum and/or an aluminum alloy, comprising at least a step (1) of contacting said at least one surface with an acidic aqueous composition (A), the acidic aqueous composition (A) comprising (a) one or more metal compounds (M) selected from the group consisting of titanium compounds, zirconium compounds, hafnium compounds, and mixtures thereof, and
(b) one or more linear polymers (P) prepared by controlled radical polymerization containing
(m1) N,N-dimethyl (meth)acryl amide,
(m2) vinylphosphonic acid, and
(m3) (meth)acrylic acid
in a form of their polymerized monomeric units,
said one or more linear polymers (P) being comprised in the acidic aqueous composition (A) in an amount of 50 to 5000 ppm, based on a total weight of the acidic aqueous composition (A).

2. The method according to claim 1, characterized in that the surface of the substrate consists of aluminum or an aluminum alloy.

3. The method according to claim 1, characterized in that the acidic aqueous composition (A) has a pH in a range of 0.5 to 6.5.

4. The method according to claim 1, characterized in that the one or more metal compounds (M) are comprised in the acidic aqueous composition (A) in a concentration in a range of 50 to 5000 ppm, based in each case on titanium, zirconium, and/or hafnium as metal.

5. The method according to claim 1, characterized in that the one or more metal compounds (M) present as component (a) are complex fluorides of titanium, zirconium, and/or hafnium.

6. The method according to claim 1, characterized in that the one or more linear polymers (P) are terpolymers containing only polymerized monomeric units of (m1) N,N-dimethyl (meth)acryl amide, (m2) vinylphosphonic acid, and (m3) (meth)acrylic acid.

7. The method according to claim 1, characterized in that the one or more linear polymers (P) are comprised in the acidic aqueous composition (A) in a concentration in a range of 100 to 4000 ppm.

8. The method according to claim 1, characterized in that the one or more linear polymers (P) have a number average molecular weight in a range of 15,000 to 50,000 g/mol.

9. The method according to claim 1, characterized in that the acidic aqueous composition (A) comprises free fluoride in a concentration in a range of 1 to 250 ppm.

10. The method according to claim 1, characterized in that the method comprises an additional coating step of applying at least one coating composition to the surface of the substrate obtained after the contacting step (1) to form a coating layer upon the surface, wherein optionally after step (1) a rinsing step (2) is carried out prior to said coating step.

11. A substrate comprising at least one surface, wherein said surface is at least partially made of aluminum and/or an aluminum alloy, wherein said at least one surface has been treated according to the method as defined in claim 1.

* * * * *